United States Patent Office 3,712,897
Patented Jan. 23, 1973

---

3,712,897
TRIAZASPIRODECANEDITHIONES
Giangiacomo Nathansohn, Vanna Aresi, and Giorgio, Winters, Milan, Italy, assignors to Gruppo Lepetit S.p.A., Milan, Italy
No Drawing. Filed June 10, 1970, Ser. No. 45,212
Int. Cl. C07d 29/36, 57/00
U.S. Cl. 260—293.66          6 Claims

ABSTRACT OF THE DISCLOSURE

Triazaspirodecanedithione compounds, such as 1,3,8-trimethyl - 1,3,8 - triazaspiro[4,5]decane - 2,4 - dithione and 1,3-dimethyl - 8 - cyclohexyl - 1,3,8 - triazaspiro[4,5]decane-2,4-dithione, are prepared by the reaction of an N-substituted 4-piperidone with an alkali metal chloride, ammonium chloride and carbon disulfide. The novel compounds are useful as antiinflammatory agents.

BRIEF SUMMARY OF THE INVENTION

This invention is concerned with new triazaspirodecanedithione compounds and a process for their preparation. More particularly, this invention is concerned with compounds corresponding to the formula:

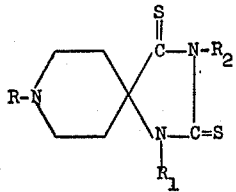

I wherein R represents lower alkyl, aryl or cycloalkyl; and $R_1$ and $R_2$ represent hydrogen or lower alkyl, $R_1$ and $R_2$ being the same. In the present specification and claims the term "lower alkyl" means and refers to lower alkyl moieties of from one to two three to four carbon atoms, inclusive; "aryl" refers to phenyl; and "cycloalkyl" refers to cyclohexyl. The triazaspirodecanedithione compounds of the invention are crystalline solids which have a high degree of antiinflammatory activity and a low order of toxicity.

The novel compounds can be prepared by the reaction of an N-substituted 4-piperidone corresponding to the formula

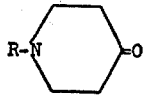

II wherein R has the significance set out above with respect to Formula I with an alkali metal cyanide, an ammonium halide and carbon disulfide. The reaction proceeds when an N-substituted 4-piperidone corresponding to Formula II, an alkali metal cyanide, an ammonium halide such as ammonium chloride and carbon disulfide are contacted together at a temperature between room temperature (about 25° C.) and the boiling temperature of the mixture. The reaction proceeds when the reactants are contacted and mixed in substantially equimolar proportions and the reaction mixture is maintained at a temperature within the reaction temperature zone for a period of time sufficient for the production of a triazaspirodecanedithione product, the reaction time being generally from about 2 to about 24 hours.

Although the reaction can be occasionally carried out in the absence of any solvent, it is usually preferred to carry out the reaction in the presence of an inert solvent as a reaction medium. Lower alkanols have been found to be particularly useful, such as ethanol alone or ethanol diluted with water. When no inert solvent is used, the product is separated from the reaction mixture, after cooling, by recrystallization from an appropriate solvent. In other instances, when an inert solvent has been used, the product can be separated by conventional procedures such as precipitation upon cooling, if necessary after concentration of the mixture to a reduced volume; and it may be desirable to remove the whole of the inert solvent and to work up the residual mass by recrystallization. This procedure allows obtainment of triazaspirodecanedithiones in which the substituents $R_1$ and $R_2$ in the above generic Formula I are hydrogen.

The compounds corresponding to the above Formula I wherein $R_1$ and $R_2$ are lower alkyl are prepared by the further step of alkylating a compound corresponding to Formula I wherein $R_1$ and $R_2$ are hydrogen by conventional alkylation procedures. For example, a compound of Formula I wherein $R_1$ and $R_2$ are hydrogen can be contacted with excess diazomethane in an appropriate inert organic liquid such as methanol, diethyl ether and mixtures thereof. The compounds can be separated and purified by conventional procedures.

Representative compounds of the invention which can be prepared according to the process hereinbefore described include:

8-methyl-1,3,8-triazaspiro[4,5]decane-2,4-dithione
1,3,8-trimethyl-1,3,8-triazaspiro[4,5]decane-2,4-dithione
8-isopropyl-1,3,8-triazaspiro[4,5]decane-2,4-dithione
8-cyclohexyl-1,3,8-triazaspiro[4,5]decane-2,4-dithione
8-butyl-1,3,8-triazaspiro[4,5]decane-2,4-dithione
8-phenyl-1,3,8-triazaspiro[4,5]decane-2,4-dithione
1,3-dimethyl-8-isopropyl-1,3,8-triazaspiro[4,5]decane-2,4-dithione
1,3-dimethyl-8-cyclohexyl-1,3,8-triazaspiro[4,5]decane-2,4-dithione
1,3-diethyl-8-isopropyl-1,3,8-triazaspiro[4,5]decane-2,4-dithione
1,3-diethyl-8-cyclohexyl-1,3,8-triazaspiro[4,5]decane-2,4-dithione
1,3-dimethyl-8-phenyl-1,3,8-triazaspiro[4,5]decane-2,4-dithione
1,3-diethyl-8-phenyl-1,3,8-triazaspiro[4,5]decane-2,4-dithione In using the compounds of the invention, an antiinflammatory amount of one or more of the compounds is administered to an animal, preferably to an animal exhibiting symptoms of inflammation.

Thus, for instance, in the carrageenin edema test, according to the method described by C. A. Winter et al., Proc. Soc. Exp. Biol. Med., 111, 544 (1962) the representative compound 8-cyclohexyl-1,3,8-triazaspiro[4,5]decane-2,4-dithione is administered per os to separate groups of rats at doses of 40 and 20 milligrams of said compound per kilogram of animal body weight. The average decrease of the experimentally induced edema observed is 39 percent and 21 percent, respectively. The $LD_{50}$ of the same compound is found to be in mice 200 milligrams per kilogram per os. In other representative operations carried out by the same procedure, the compound 8-methyl-1,3,8-triazaspiro[4,5]decane-2,4-dithione is given to the rats at doses of 100 and 50 milligrams per kilogram. The corresponding decrease of edema observed was 40.3 percent and 21 percent respectively. Such compound is found to have an $LD_{50}$ of 500 milligrams per kilogram. In other representative operations carried out according to the granuloma pellet test as described by R. Meier et al., Experientia 6, 494 (1950), the compound 8-isopropyl-1,3,8-triazaspiro[4,5]decane-2,4-dithione is administered to rats at doses of 200 and 100 milligrams per kilogram.

The inhibition of the granuloma observed at such dosage rates is 34 percent and 23 percent, respectively. The $LD_{50}$ is found in this case to be 1,000 milligrams per kilogram per os in mice. The same compound is found to have remarkable activity also been when tested under these conditions on adrenalectomized rats. In this case an inhibition of 17 percent is found at a dosage rate of 200 milligrams per kilogram.

DESCRIPTION OF PREFERRED EMBODIMENTS

The following examples are illustrative of the invention

EXAMPLE 1

8-methyl-1,3,8-triazaspiro[4,5]decane-2,4-dithione

To a solution of 113 grams of 1-methyl-4-piperidone in 500 milliliters of aqueous ethanol, 55 grams of ammonium chloride, 50 grams of sodium cyanide and 77 grams of carbon disulfide are added and the mixture is heated at a temperature of 50–60° C. for 15 hours with stirring. The solvent is then distilled off in vacuo to about one-half of its volume and the concentrated mixture is cooled. The product separates as crystalline precipitate. The 8-methyl-1,3,8-triazaspiro[4,5]decane - 2,4 - dithione product is collected, dried, and found to melt at 280° C. 66 grams of the named product are obtained.

EXAMPLE 2

1,3,8-trimethyl-1,3,8-triazaspiro[4,5]decane-2,4-dithione

A solution of the compound of the preceding example (21.5 grams) in 200 milliliters of methanol is contacted and mixed at room temperature with 16.4 grams of diazomethane and 300 milliliters of diethyl ether for 2 hours. The liquids are distilled off in vacuo to obtain the product as a residue. The residue is dissolved in chloroform and chromatographed through a column of silica gel using a mixture of methanol and chloroform as a solvent for elution. The 1,3,8-trimethyl-1,3,8-triazaspiro[4,5]decane-2,4-dithione product thus purified by chromatography is obtained as a crystalline solid melting at 102°–104° C. Thirteen grams of the product are obtained and the yield is calculated to be 53 percent (based on the 8-methyl-1,3,8-triazaspiro[4,5]decane-2,4-dithione).

EXAMPLE 3

8-isopropyl-1,3,8-triazaspiro[4,5]decane-2,4-dithione

To a solution of 141 grams of 1-isopropyl-4-piperidone in 500 milliliters of aqueous methanol, 55 grams of ammonium chloride, 50 grams of sodium cyanide and 77 grams of carbon disulfide are added. The resulting mixture is heated at a temperature of 60°–65° C. for 10 hours. After evaporation of the solvent to about one-third of the initial volume followed by cooling, the prduct precipitates in the mixture. The 8-ispropyl-1,3,8-triazaspiro[4,5]decane-2,4-dithione product is collected, dried, and found to melt at 288°–290° C. 58 grams of the product are obtained.

EXAMPLE 4

8-cyclohexyl-1,3,8-triazaspiro[4,5]decane-2,4-dithione

A solution of 18.1 grams of 1-cyclohexyl-4-piperidone, 5.5 grams of ammonium chloride, 5 grams of sodium cyanide and 7.7 grams of carbon disulfide in 100 milliliters of aqueous ethanol is heated at a temperature of about 70° C. for 12 hours. The mixture is cooled, whereupon the product precipitates in the mixture. The 8-isopropyl - 1,3,8-triazaspiro[4,5]decane-2,4-dithione product is collected, dried and found to melt at 249°–251° C. 14 grams of the named triazaspirodecanedithione product are obtained.

What is claimed is:

1. A compound corresponding to the formula:

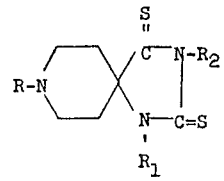

wherein R represents a member of the group consisting of lower alkyl of one to four carbon atoms, inclusive, and cyclohexyl; and $R_1$ and $R_2$ both represent the same member of the group coonsisting of hydrogen and lower alkyl.

2. A compound of claim 1 wherein $R_1$ and $R_2$ both represent hydrogen.

3. A compound of claim 1 wherein $R_1$ and $R_2$ both represent methyl.

4. A compound of claim 1 wherein R represents isopropyl.

5. A compound of claim 1 wherein the compound is 8-isopropyl-1,3,8-triazaspiro[4,5]decane-2,4-dithione.

6. A compound of claim 1 wherein the compound is: 8-cyclohexyl-1,3,8-triazaspiro[4,5]decane-2,4-dithione.

References Cited

J. Org. Chem. 22, 1061–1065 (1957), Mailey et al.
Medicinal Chem. Burger (1951), Interscie. Pub., N.Y., vol. 1, 45 and 48.
J. Chem. Soc., 1947, 681–86, Carrington.

HENRY R. JILES, Primary Examiner

S. D. WINTERS, Assistant Examiner

U.S. Cl. X.R.

424—267